Feb. 13, 1923.

R. W. PITTMAN.
HIGH SPEED MOTION PICTURE APPARATUS.
FILED OCT. 3, 1921.

INVENTOR
R.W. Pittman,
BY Wm H. Reid
ATTORNEY

Feb. 13, 1923.
R. W. PITTMAN.
HIGH SPEED MOTION PICTURE APPARATUS.
FILED OCT. 3, 1921.

INVENTOR
R. W. Pittman,
BY
Wm. H. Reid
ATTORNEY

Patented Feb. 13, 1923.

1,444,884

UNITED STATES PATENT OFFICE.

REINHART W. PITTMAN, OF NEW YORK, N. Y.

HIGH-SPEED MOTION-PICTURE APPARATUS.

Application filed October 3, 1921. Serial No. 505,164.

*To all whom it may concern:*

Be it known that I, REINHART W. PITTMAN, a citizen of the United States, and a resident of New York city, in the county of New York and State of New York, have invented certain new and useful Improvements in High-Speed Motion-Picture Apparatus, of which the following is a specification.

This invention has reference to the mechanism for intermittently advancing the image member in a motion picture apparatus, or similar device wherein it is desired to intermittently advance an image member; particularly where such image member is in the form of a web or strip of flexible and substantially resilient material, such as the ordinary celluloid or gelatin films at present employed in motion picture apparatus.

The object of the invention is to provide means especially adapted for use at comparatively high speed movement of a film in cameras for taking pictures of objects in motion; and further to provide mechanism whereby the reaction of a flexed film of this character will cause its reengagement with the feed member at the end of each return stroke.

In the accompanying drawing showing one embodiment of my invention, Figure 1 is a side elevation, partly in section of the device.

Figure 1:
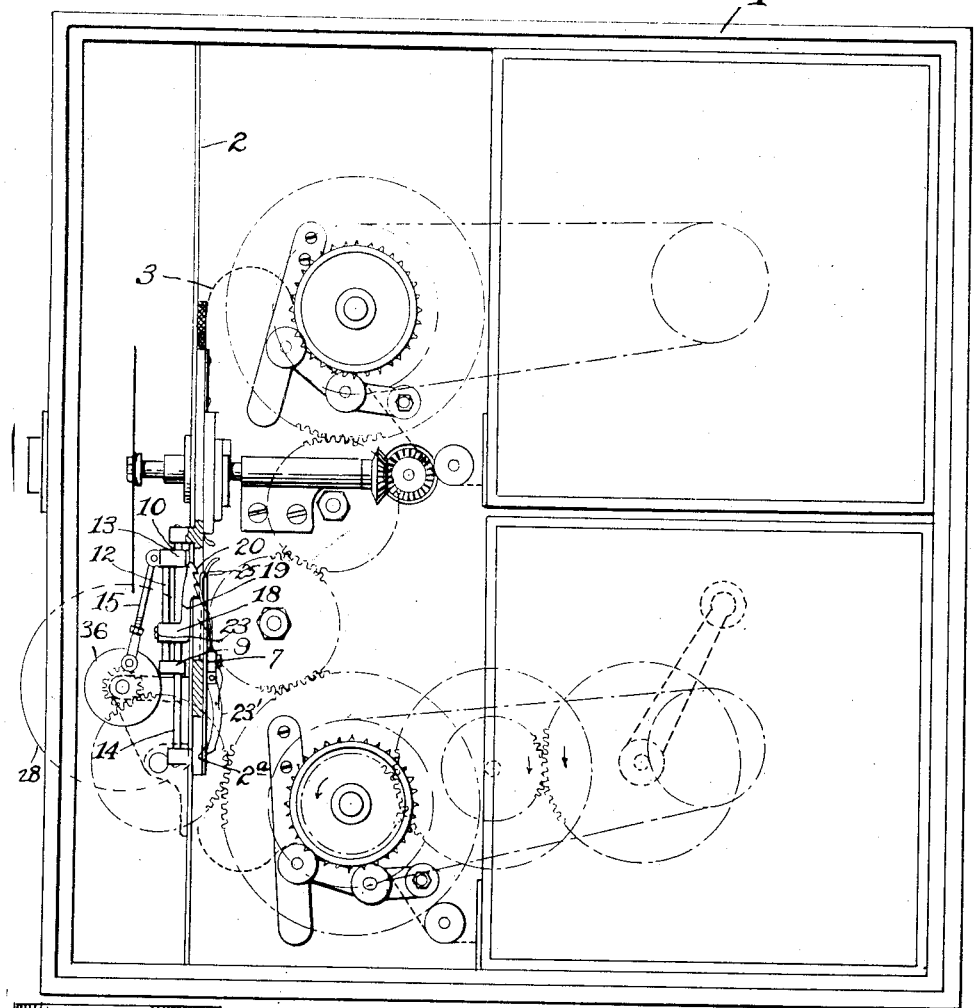
Figure 8:
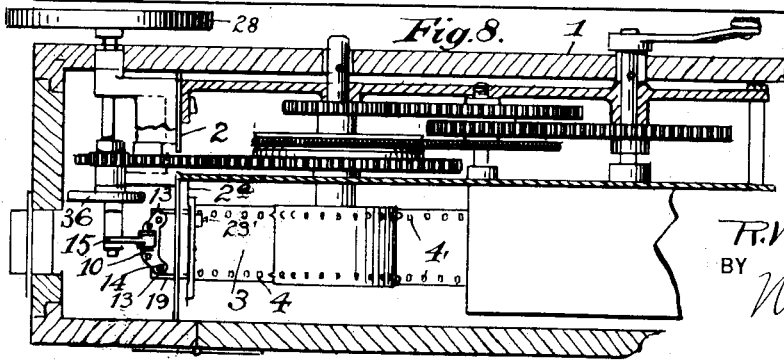
Fig 8 is a section showing the train of gearing

As set forth in the drawing, the camera denoted generally by 1 is provided with a supporting plate 2 on which the feed mechanism and other parts are mounted. The plate 2 carries a guideway 2$^a$ for the film 3, shown with the usual apertures 4 at the marginal portion, for engagement with the feeding member. The film travels in a recessed portion 5 of the plate 2$^a$, see Fig. 5; and is held loosely against the bottom wall 6 of this recess by a thin plate 7. This plate is of less width than the film between the apertures 4, and preferably has its side edges curved laterally, see Fig. 6. This is arranged to hold the film closely to its position but not tight against the wall 6 of the guide plate 2$^a$. Above the said guideway the film may be guided by the usual spring tension plate 8, mounted on the door 8$^a$, that will press the film against the plate 2$^a$ and prevent its advancing faster than it is fed by the feed mechanism.

Where the film is held between the plates 7 and 8 I arrange a feed member that is mounted on the plate to reciprocate in a fixed linear path, in the present form such path being rectilinear. A frame is provided composed of blocks 9 and 10 secured to bars 11 and 12, said blocks having guide ears 13, 13 that slide on two posts 14, 14, mounted on the back of the plate 2$^a$. Any suitable means may be employed to reciprocate this frame, a crank rod 15 being shown pivoted on a crank disk 36, that may be driven at a high speed by a train of gearing as indicated in Figs. 1 and 8, or any other suitable mechanism.

The feeding member or means is rigidly secured to this frame and therefore must travel in a rectilinear path. It will be observed that such member has absolutely no lateral movement. I provide a feed member on this frame in the form of one or more ratchet teeth, having a transverse face and an angular face, and such tooth or teeth are mounted on the frame to travel adjacent the film margin in the path of movement of the film, whereby the tooth can extend a short distance into the aperture of the film and advance the film with the tooth and frame in one direction of movement, while on the return movement the inclined face of the tooth will press against the film apertured margin, and tend to displace this portion of the film laterally. The latter is permitted by reason of the plate 7 engaging closely the film inside of its apertured margin only.

Figure 7:
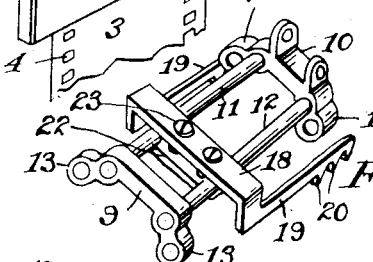
Fig. 7 shows the feed member, detached.
Figure 5:
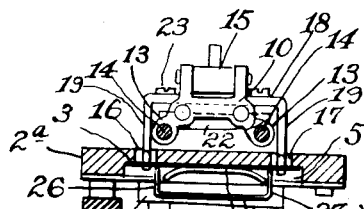
Fig. 5 is a transverse section on the line 5—5 of Fig 2.

As indicated in Fig. 5, the plate 2$^a$ is provided with slots 16, 17, arranged opposite the line of perforations of the film and beyond the edges of the plate 7. As indicated in Fig. 7 the tooth member is in the form of a bar or strip 18, having arms 19, 19, each provided with three teeth 20, of a ratchet form. This bar is rigidly secured to the frame member, but preferably adjustable thereon to properly frame the image member at the exposure window 21. A block 22 is pressed against the bars 11 and 12 by screws 23 passing through the bar 18, which will permit adjustment along the frame to the proper position to center the image in the window 21.

Figure 2:
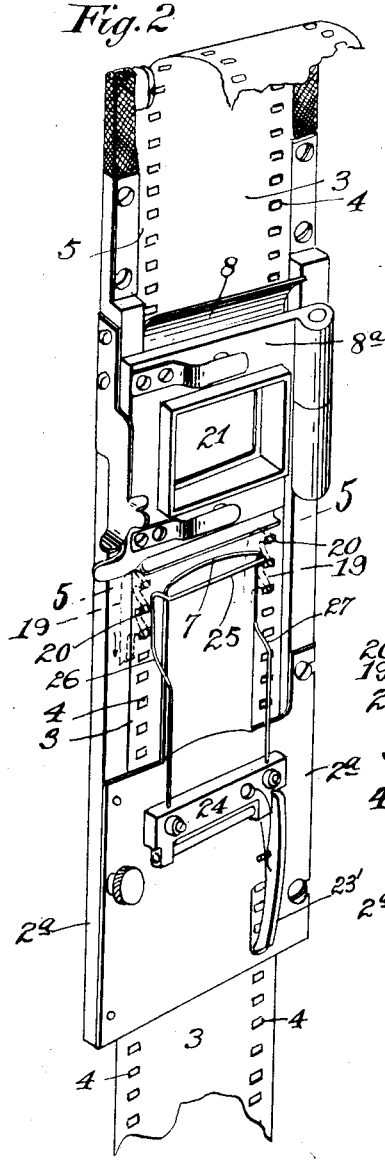
Fig. 2 is a perspective view of the feed mechanism at the end of the return stroke.
Figure 3:
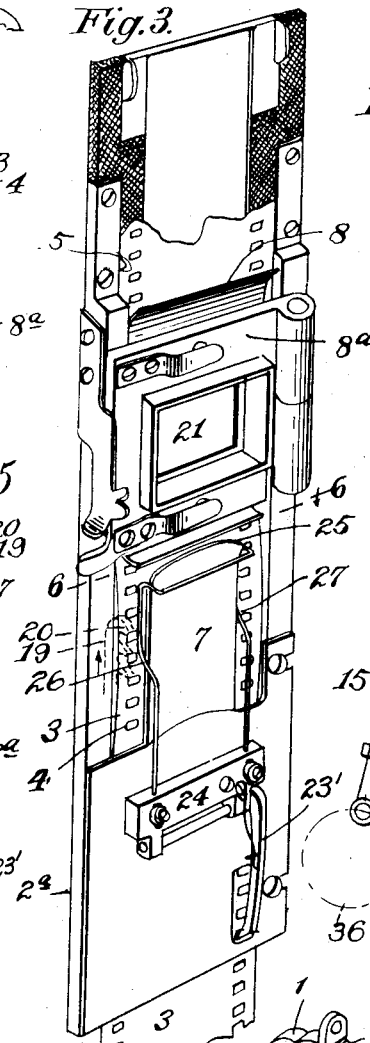
Fig. 3 is a similar view at an intermediate part of the return stroke.
Figure 4:
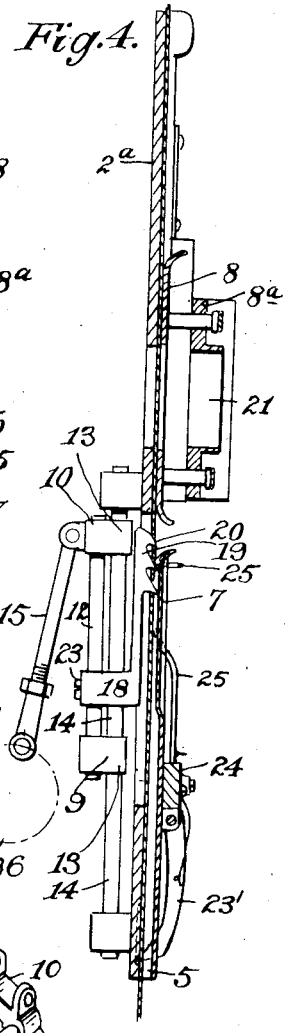
Fig. 4 is a longitudinal section.
Figure 6:
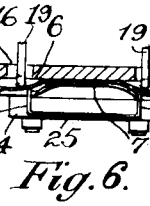
Fig. 6 is a transverse section on the line 6—6 of Fig. 3.

It will be seen from Fig. 4 that the frame will reciprocate with the teeth projecting into the slots 16 and 17 and pressing lightly against the film at the perforations, the film being normally held flat against the face of the guideway by the plate 7 as indicated in Fig. 5, when the holes of the film register with the teeth as indicated in Fig. 2, the teeth passing a short distance into the holes. As the frame moves downwardly the transverse faces of the teeth will engage the apertured margins and advance the film downwardly as shown, for the stroke of the frame. But on the return stroke of the frame and teeth, the inclined face of the teeth will act on the film margins and press them outwardly a short distance, as indicated in Figs. 3 and 6. This is permitted by the natural flexibility of the film, and the arrangement of the narrow plate 7 that engages only the middle portion of the film. When the feed member and teeth reach the limit of the up-stroke and the teeth again register with certain apertures of the film, the natural resiliency of the film will cause it to react against this flexed form and straighten to a flat condition, that will bring the apertured portions to re-engage the teeth, and the advance stroke of the feed member and teeth will again advance the film. The retraction of the feed member will again flex the film that will not travel back, and the same operation just described will be repeated.

To prevent any tendency of the film to move up on the return stroke, I provide a suitable member to engage the film and prevent its retraction, a spring pawl 23' being shown pivoted on a block 24 that will engage the holes in the film and prevent upward movement. The block 24 is adjustable up and down so it may be brought to a perfect register with the apertures of the film.

While the described arrangement will operate in conjunction with the natural elasticity of the film, I further provide a spring member arranged to lightly press the film margins back to a flat form to engage the feed member, when the film has been flexed on the return stroke. As shown I provide a bail 25 of spring wire having side portions 26 and 27 arranged to engage the film just inside of its line of perforations, the bail being mounted on the block 24 and serving to act when the film is flexed, to press the film margins into engagement with the teeth.

The main object of this invention is to provide a high speed camera for making exposures of objects in rapid motion, whereby different positions in very small sequence can be recorded. Obviously the developed film can reproduce these motions at a much reduced speed if desired. By this means the exact positions of objects in rapid motion can be recorded.

It will be observed that the main feature of the present invention lies in the arrangement that the feed member reciprocates absolutely in a fixed linear path and is given no lateral movement to engage and disengage the film. Such lateral movement is furnished by the film itself. Since the film is engaged by several teeth on each side the strain on the film is not any greater than usual. The engagement and disengagement depends upon the spring in the film itself, but at each exposure a new portion of the film is in operation with the feed member, and any strain resulting therefrom, is not confined to any one portion of the film, but extended over consecutive portions and since this is mainly used for making exposures, the same film is only used once for this purpose and then developed and printed.

It will be particularly noted that while I provide the pawl 23' perfect results have been obtained without its use. Also the bail 25 might be dispensed with. A balance wheel 28 to give a perfect smooth action to the running gear is preferably mounted on the staff that carries the crank disk which has the highest speed of the train.

In this art it is customary to operate a motion picture camera at about one thousand exposures per minute, and the projection machine is operated at the same speed, so that the reproduction corresponds to the original. Where the usual camera is operated at a greater speed injurious effects have resulted and the apparatus has been found to very quickly become injured and failed to operate properly. With the present invention the camera has been operated a great many times at a speed of six to eight thousand exposures per minute, and the same apparatus may be employed to cause the projection of such films, and it is found that the apparatus as set forth herein does not become injured or defective and is eminently successful; nor is the film injured or unduly worn by such machines. But obviously the films taken at this unusual high speed can be projected with a normal projecting machine, whereby the rapid motion of the objects is reduced and can be easily followed by and observed, and such apparatus is of a great utility for scientific, educational and other purposes.

What I claim is:

1. The combination with an apertured flexible film, of a guide member for the film arranged to permit flexing of an apertured portion of the film, and a reciprocating feed member provided with means arranged to flex the film on the return stroke of the feed member whereby to cause its operative disengagement with the film, and which means on the advance stroke of the feed member will be brought into operative engagement with the apertured film margins by the automatic straightening of the film flexed on the return stroke, to cause the film to be fed.

2. The combination with an apertured flexible film, of a guide member for the film arranged to permit flexing of an apertured portion of the film, a reciprocating feed member provided with means arranged to flex the film on the return stroke of the feed member whereby to cause its operative disengagement with the film, and which means on the advance stroke of the feed member will be brought into operative engagement with the apertured film margins by the automatic straightening of the film flexed on the return stroke, to cause the film to be fed, and means to prevent backward movement of the film on the return stroke of the feed member.

3. The combination with an apertured flexible film, of a guide member for the film arranged to permit flexing of an apertured portion of the film, a reciprocating feed member provided with means arranged to flex the film on the return stroke of the feed member whereby to cause its operative disengagement with the film, and which means on the advance stroke of the feed member will be brought into operative engagement with the apertured film margins by the automatic straightening of the film flexed on the return stroke, to cause the film to be fed, and a spring wire bail arranged to engage the film margins to shift them when flexed to cause engagement with the feed member.

4. The combination with an apertured flexible film, of a guide member for the film arranged to permit flexing of an apertured portion of the film, a reciprocating feed member provided with means arranged to flex the film on the return stroke of the feed member whereby to cause its operative disengagement with the film, and which means on the advance stroke of the feed member will be brought into operative engagement with the apertured film margins by the automatic straightening of the film flexed on the return stroke, to cause the film to be fed, and a resilient member arranged to engage the film to shift the film margins when flexed to cause engagement with the feed member.

5. The combination with an apertured flexible film, of a guide member for the film arranged to permit flexing of an apertured portion of the film, a reciprocating feed member provided with means arranged to flex the film on the return stroke of the feed member whereby to cause its operative engagement with the film, and which means on the advance stroke of the feed member will be brought into operative engagement with the apertured film margins by the automatic straightening of the film flexed on the return stroke, to cause the film to be fed, and a spring pawl in engagement with the film apertured margins to prevent backward movement of the film.

6. The combination with an apertured flexible film, of a guide member for the film arranged to permit flexing of an apertured portion of the film, and a reciprocating feed member provided with teeth of ratchet form arranged to flex the film on the return stroke of the feed member whereby to cause its operative disengagement with the film and which teeth on the advanced stroke of the feed member will be brought into operative engagement with the apertured film margins by the automatic straightening of the film flexed on the return stroke, to cause the film to be fed.

7. The combination with an apertured flexible film, of a guide member for the film arranged to permit flexing of an apertured portion of the film, a reciprocating feed member provided with teeth of ratchet form arranged to flex the film on the return stroke of the feed member whereby to cause its operative disengagement with the film, and which teeth on the advance stroke of the feed member will be brought into operative engagement with the apertured film margins by the automatic straightening of the film flexed on the return stroke, to cause the film to be fed, and means to prevent backward movement of the film on the return stroke of the feed member.

8. The combination with an apertured flexible film, of a guide member for the film arranged to permit flexing of an apertured portion of the film, a reciprocating feed member provided with teeth of ratchet form arranged to flex the film on the return stroke of the feed member whereby to cause its operative disengagement with the film, and which teeth on the advance stroke of the feed member will be brought into operative engagement with the apertured film margins by the automatic straightening of the film flexed on the return stroke, to cause the film to be fed, and a spring wire bail arranged to engage the film margins to shift them when flexed to cause engagement with the feed member teeth.

9. The combination with an apertured flexible film, of a guide member for the film arranged to permit flexing of an apertured portion of the film, a reciprocating feed member provided with teeth of ratchet form to flex the film on the return stroke of the feed member whereby to cause its operative disengagement with the film, and which teeth on the advance stroke of the feed member will be brought into operative engagement with the apertured film margins by the automatic straightening of the film flexed on the return stroke, to cause the film to be fed, and a resilient member arranged to engage the film to shift the film margins when flexed to cause engagement with the feed member.

10. The combination with an apertured flexible film, of a guide member for the film arranged to permit flexing of an apertured portion of the film, a reciprocating feed member provided with teeth of ratchet form arranged to flex the film on the return stroke of the feed member whereby to cause its operative disengagement with the film, and which teeth on the advance stroke of the feed member will be brought into operative engagement with the apertured film margins by the automatic straightening of the film flexed on the return stroke, to cause the film to be fed, and a spring pawl in engagement with the film apertured margins to prevent backward movement of the film.

11. The combination with an apertured film, of a guide member for the film that is provided with a pair of opposed walls arranged to engage the opposite faces of the film, one wall having a pair of slots to expose the film apertured portions, the opposing wall of the guide member extending across between the lines of perforations only to expose the film at and beyond the apertured portions, and a feed member projecting through the slotted portions to engage the film at the apertured portions and mounted to reciprocate in such position without retraction from the guideway, the feed member having engaging portions that enter the film apertures and feed the film when advanced, and which portions on return stroke will flex the film margins away from the slotted wall portions to disengage the film from the feed member.

12. The combination with an apertured film, of a guide member for the film that is provided with a pair of opposed walls to engage the opposite faces of the film, one wall having a pair of slots to expose the film apertured portions, the opposing wall of the guide member extending across between the line of perforations only to expose the film at and beyond the apertured portions, and a feed member having teeth projecting through the slotted portions to engage the film at the apertured portions and mounted to reciprocate in such position without retraction from the guideway, the feed member teeth having transverse faces that engage the film apertures and feed the film when advanced, the teeth having inclined faces that on return stroke will flex the film margins away from the slotted wall portions to disengage the film from movement by the feed member.

Signed at New York city, N. Y., on October 1st, 1921.

REINHART W. PITTMAN.